United States Patent [19]
Angelo

[11] Patent Number: 5,823,612
[45] Date of Patent: Oct. 20, 1998

[54] VEHICLE DASH STORAGE BOX ASSEMBLY

[75] Inventor: Jeffrey J. Angelo, Kirkland, Wash.

[73] Assignee: PACCAR Inc, Bellevue, Wash.

[21] Appl. No.: 642,205

[22] Filed: May 1, 1996

[51] Int. Cl.⁶ ..................................................... B60R 7/06
[52] U.S. Cl. ......................................................... 296/37.12
[58] Field of Search ............................... 296/37.12, 37.8, 296/37.9; 224/483, 542, 544, 281; 312/327, 328

[56] References Cited

U.S. PATENT DOCUMENTS

| | | | |
|---|---|---|---|
| 3,386,765 | 6/1968 | Drach, Jr. | 296/37.12 |
| 5,197,775 | 3/1993 | Reeber | 296/37.12 |

FOREIGN PATENT DOCUMENTS

| | | | |
|---|---|---|---|
| 957279 | 1/1957 | Germany | 296/37.9 |

Primary Examiner—Joseph D. Pape
Attorney, Agent, or Firm—Wells, St. John, Roberts, Gregory & Matkin, P.S.

[57] ABSTRACT

A dashboard and glove box assembly for mounting within a vehicle includes a dashboard having an opening formed therein for providing access to an area interiorly of said dashboard. A glove box is removably insertable into the opening, and a connection system forms a releasable connection between the glove box and the opening whereby the glove box may be conveniently removed for providing access to the area interiorly of the dashboard. A latch is used to secure the glove box assembly in a closed condition. A connection joint is detachable to allow complete removability of the glove box and attached door to provide increased serviceability.

5 Claims, 6 Drawing Sheets

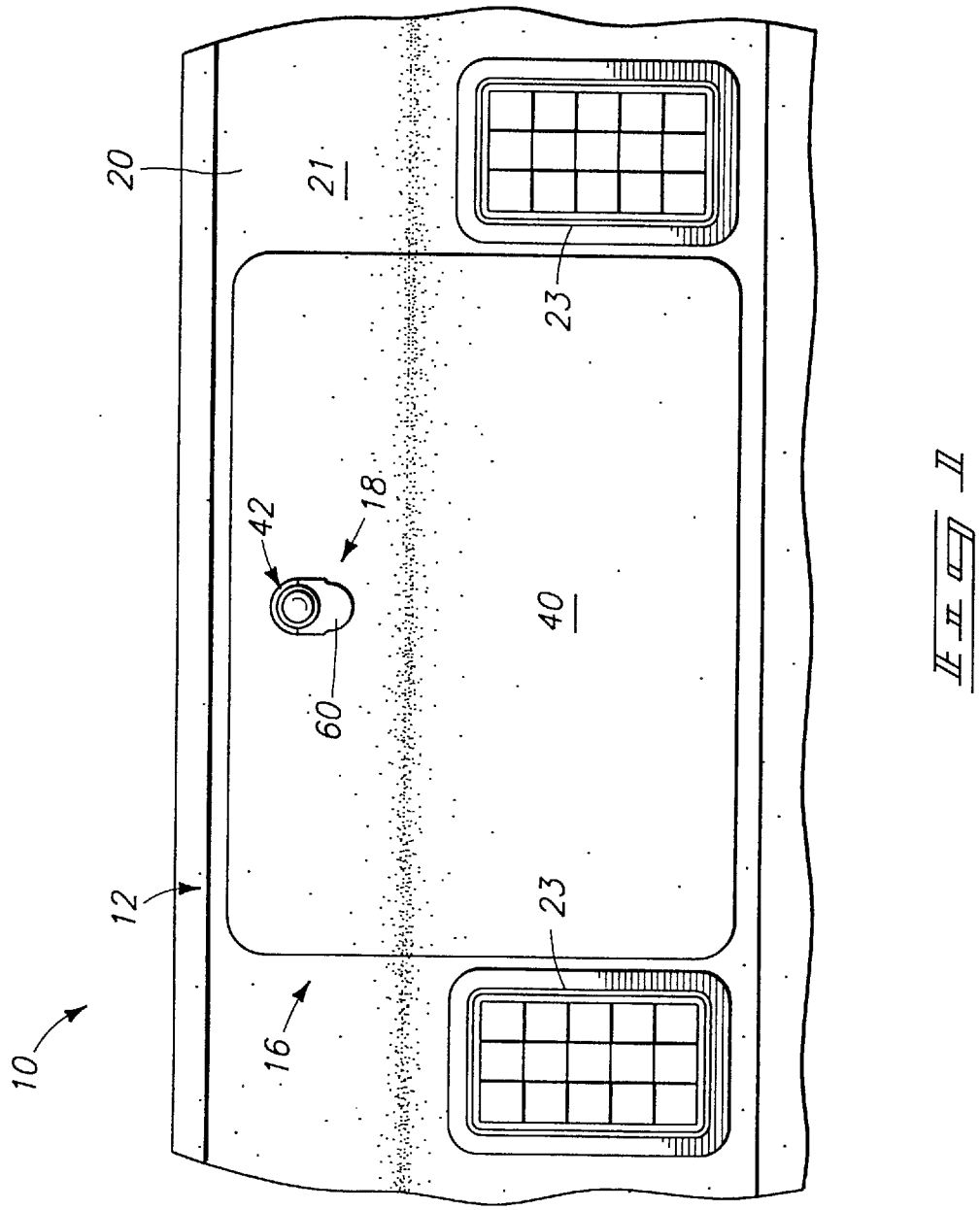

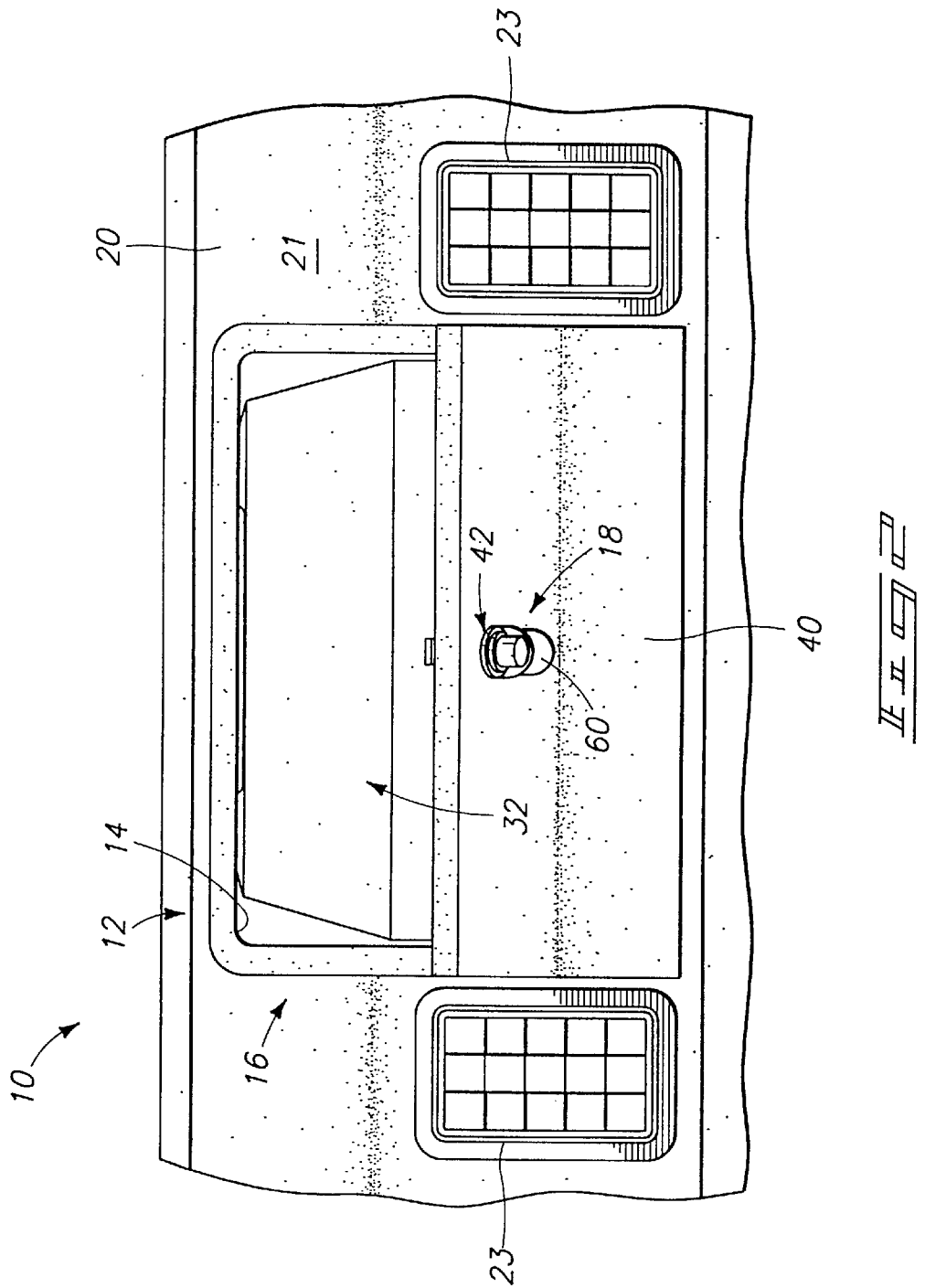

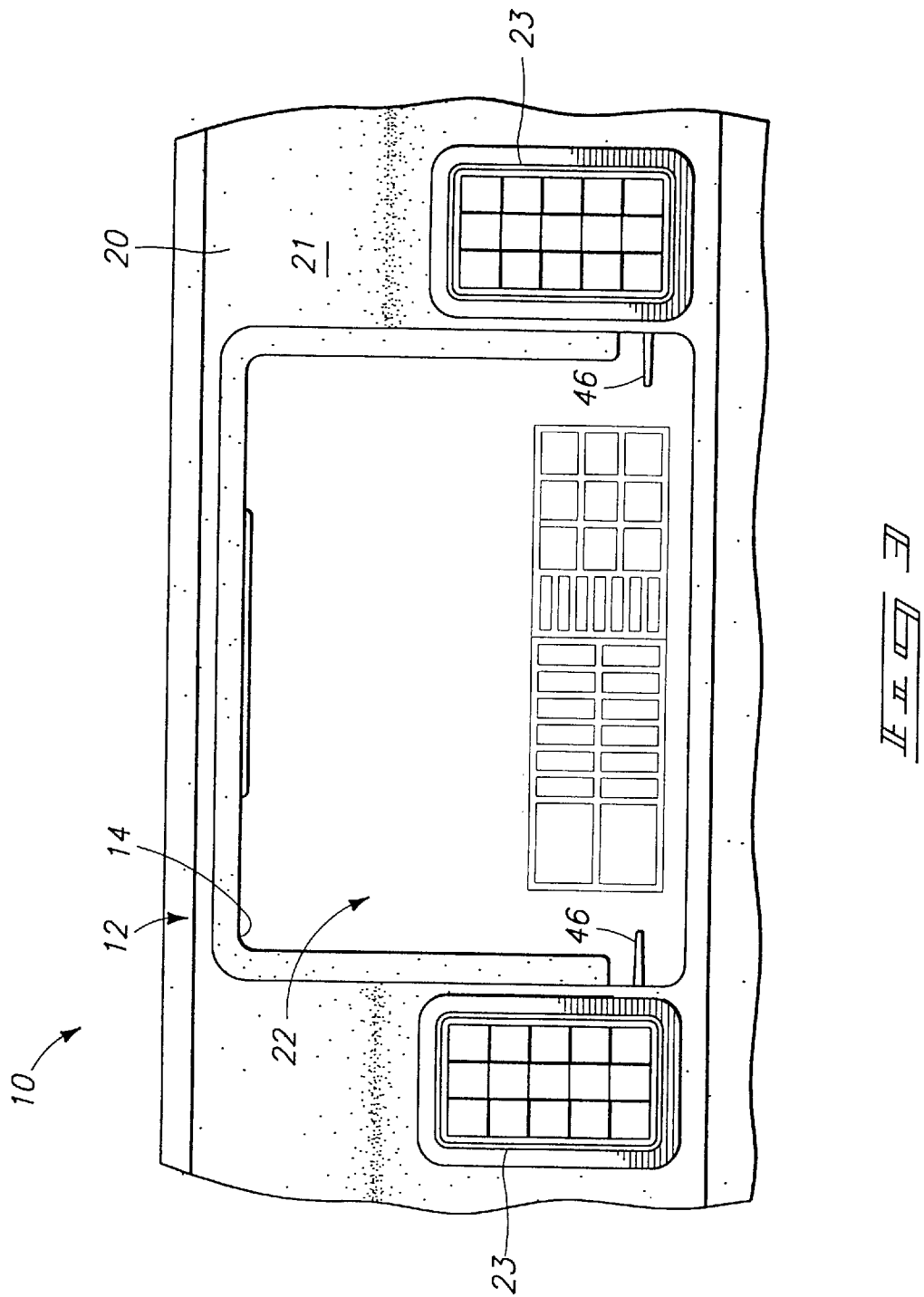

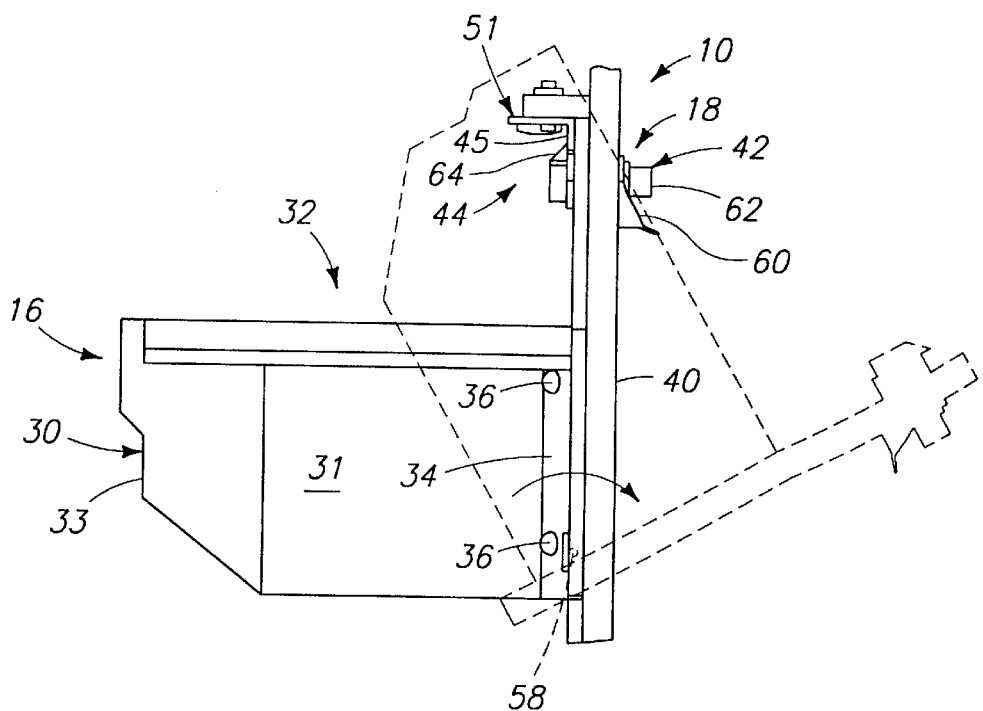
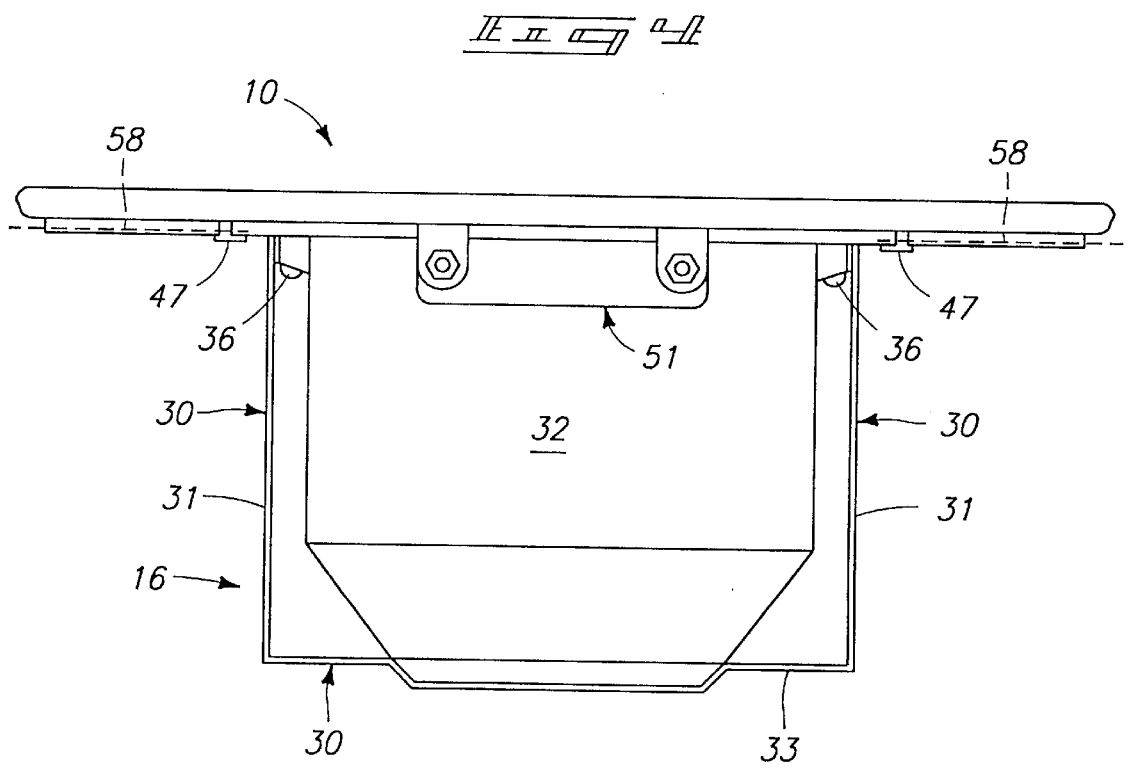

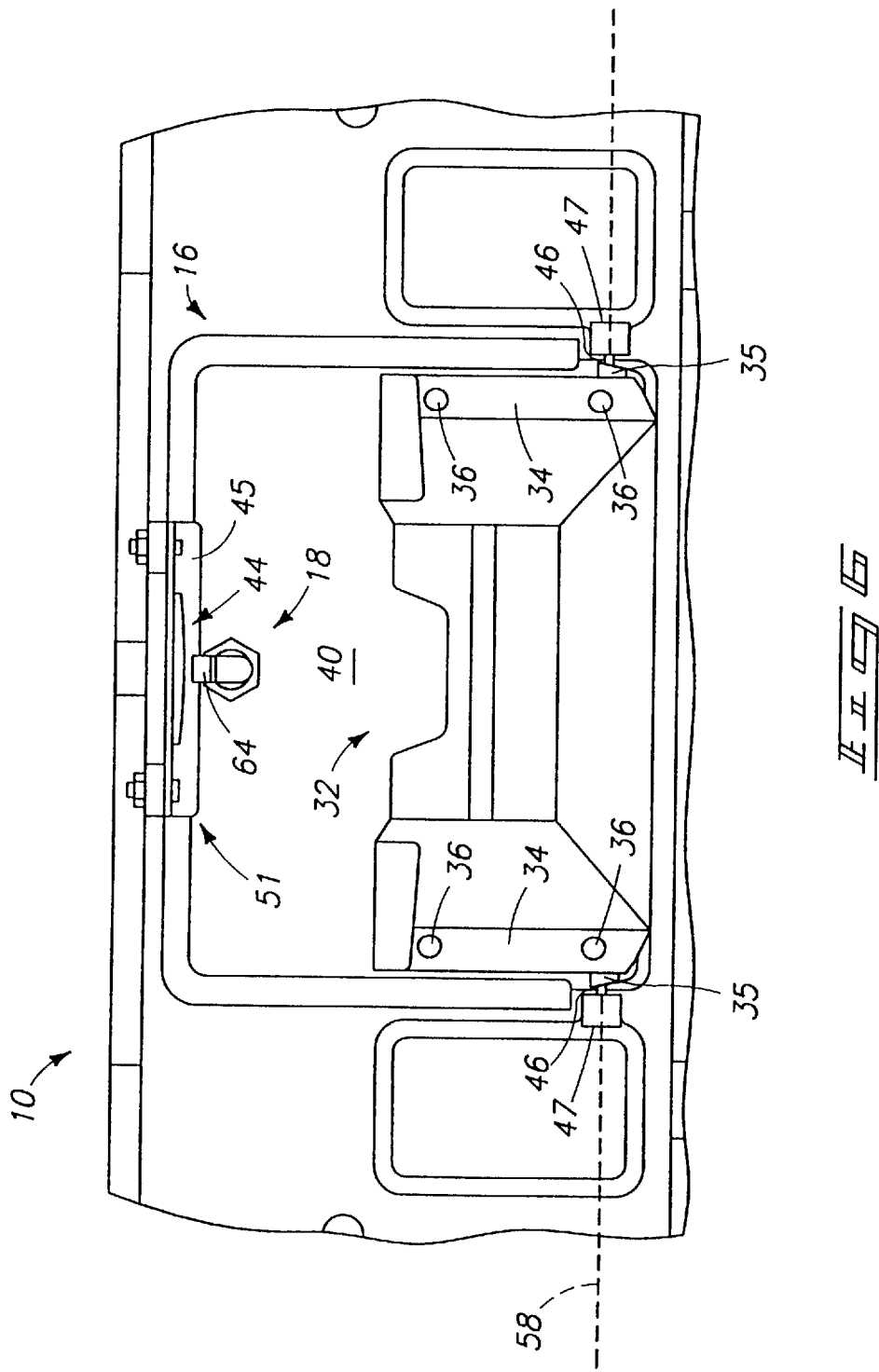

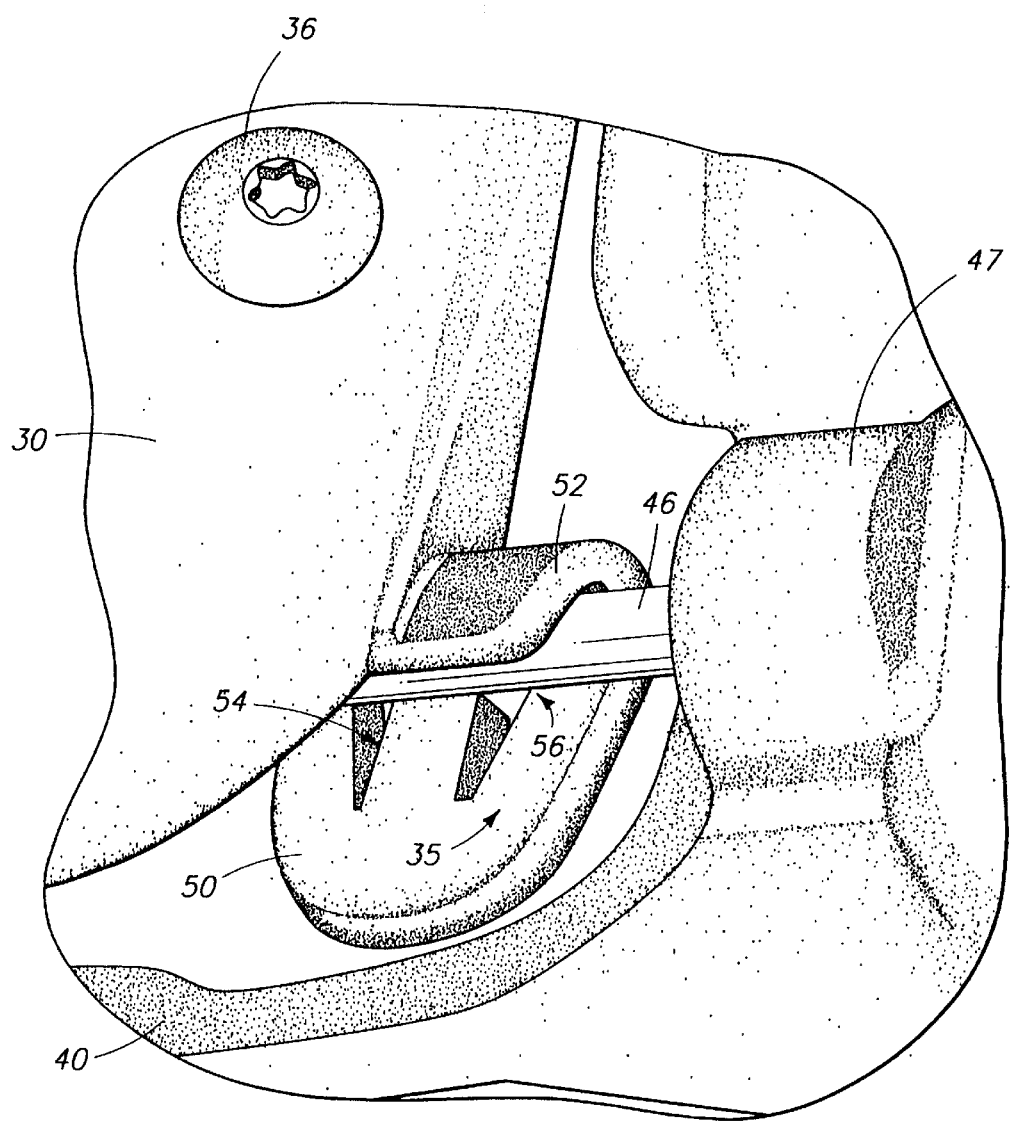

VEHICLE DASH STORAGE BOX ASSEMBLY

TECHNICAL FIELD

This invention relates generally to vehicle glove boxes, and more particularly it concerns a vehicle dashboard and glove box assembly whereby the glove box may be conveniently removed for providing access to an area interiorly of the dashboard.

BACKGROUND OF THE INVENTION

Glove boxes are typically mounted on or in a vehicle dashboard and include a door for providing access thereto. Prior dash boxes usually have doors which are pivotally mounted to the dash and boxes which are securely fastened to the dash from the inside.

Vehicle dashboards typically house or contain a variety of vehicle components, such as wiring, heat or air conditioner ducts, and the like which often require work or servicing, either during initial assembly of a vehicle or as part of a post-purchase maintenance regimen. A service provider usually removes at least a portion of the dashboard or the entire dashboard, in order access the necessary vehicle components in need of servicing. Alternatively, a service provider may have just enough room to gain access from under the dashboard. In the latter case, the box is sometimes in the way of the service work needed. Either way, gaining access to the area necessary to effect the desired servicing is difficult to say the least.

This invention grew out of the need to provide easier access to areas inside of vehicle dashboards which include vehicle components in need of servicing. It further grew out of a desire for a fully removable dash storage box unit.

BRIEF DESCRIPTION OF THE DRAWINGS

Preferred embodiments of the invention are described below with reference to the accompanying drawings, which are briefly described below.

FIG. 1 is a front view of dashboard and glove box assembly constructed according to a preferred embodiment of the present invention, which shows the glove box in a closed position.

FIG. 2 is a front view which is similar to the view shown in FIG. 1, which shows the glove box in an opened position.

FIG. 3 is a front view of the dashboard which shows an opening in the dashboard into which the glove box may be inserted.

FIG. 4 is a side view which shows the glove box in both an opened and closed position.

FIG. 5 is a top view of a glove box and door subassembly according to a preferred embodiment of the invention.

FIG. 6 is a rear view of the glove box and door subassembly.

FIG. 7 is an enlarged perspective view of a mounting pin and mounting pin receiver according to a preferred aspect of the invention.

DETAILED DESCRIPTION OF THE PREFERRED EMBODIMENTS

This disclosure of the invention is submitted in furtherance of the objectives of patent laws to promote the progress of science, technology and the useful arts.

TABLE 1

Listing of Subsections of Detailed Description and Pertinent Items with Reference Numerals and Page Numbers

| Item | Page | Item | Page |
|---|---|---|---|
| Assembly Generally | 4 | Door | 7 |
| dashboard and glove box assembly 10 | 4 | door 40 | 7 |
| dashboard 12 | 4 | Detachable Box | 8 |
| opening 14 | 4 | Connection System | |
| glove box 16 | 4 | mounting pins 46 | 8 |
| latch 18 | 4 | bosses 47 | 8 |
| Dashboard | 4 | base 50 | 9 |
| dashboard outer surface 20 | 4 | dog 52 | 9 |
| dash front surface area 21 | 4 | detent 54 | 9 |
| interior area 22 | 5 | capture region 56 | 9 |
| air conditioning/heating vents 23 | 5 | pivot axis 58 | 9 |
| Glove Box | 6 | Latch Mechanism | 10 |
| walls 30 | 6 | latch handle 60 | 10 |
| enclosure 32 | 6 | release button 62 | 10 |
| side wails 31 | 6 | detent 64 | 10 |
| end wall 33 | 6 | interior surface 45 | 11 |
| perimetral edge region 34 | 6 | engagement fixture 51 | 11 |
| door 40 | 6 | Operation | 12 |
| screws 36 | 6 | * * * (End of | |
| mounting pin receivers 35 | 6 | Table 1) * * * | |

Assembly Generally

FIGS. 1 and 2 show a dashboard and glove box assembly 10 according to the preferred embodiment of the present invention. Dashboard and glove box assembly 10 includes a dashboard 12 having an opening 14 formed therein. A glove box 16 is mounted upon the dashboard or dash 12 at opening 14. The glove or dash storage box 16 is secured in a closed position using a latch 18.

Glove box 16 is movable, relative to dashboard 12, between a closed position which is shown in FIG. 1, and an opened position which is shown in FIGS. 2 and 4. In the opened position the rearward portions of the glove box engage the dash to stop pivotal movement as illustrated in phantom in FIG. 4. Preferably, the glove box is pivoted between such positions in a manner described in detail below. As will become apparent, it is also possible for the glove box to be mounted on the dashboard so as to use other types of relative movement. In the preferred embodiment, dashboard and glove box assembly 10 is intended for use in a vehicle, such as a truck cab suitable for use in a tractor-trailer configuration. It should be understood that the inventive dashboard and glove box assembly 10 may be utilized in other suitable vehicles.

Dashboard

FIGS. 1 and 2 show that dashboard 12 includes a dashboard outer surface 20 at least a portion of which defines a dash front surface area 21. Dashboard 12 may be constructed or formed from any suitable material. Preferably, the dashboard is formed from a material which is durable, lightweight and strong enough to withstand the stresses expected in the operating environment. Such material should also be inexpensive and easy to work with. Suitable materials include those materials which are normally used to form vehicle dashboards, such as thermoplastics or rigidified polymeric materials.

Opening 14 is provided in dashboard outer surface 20 and allows access to an interior area 22 inside of dashboard 12. Interior area 22 is shown in more detail in FIG. 3 where various electronic componentry (not specifically designated) may be seen. Exemplary electronic componentry might include a vehicle fuse system, vehicle system controllers, and other such componentry as is usually associated with a tractor-trailer cab. It will be understood, however, that such componentry may be any type of componentry for any type of vehicle and not necessarily a tractor-trailer cab. Interior area 22 is also useful for containing or housing items such as heating or air conditioning conduits. Dashboard 12 includes air conditioning/heating vents 23 on either side of opening 14 which are operatively connected to the heating and/or air conditioning conduits just mentioned. Vents 23 provide a means for ventilating the passenger compartment inside of which dashboard 12 is located.

Opening 14 advantageously provides convenient access to interior area 22 for enabling servicing of such items as might be included therein, such as the componentry or the air conditioning/heating vents mentioned above. Such access is provided or facilitated by glove box 16 which is removably insertable into opening 14 as will become apparent below. As shown in FIG. 3, opening 14 is generally rectangularly shaped, although a variety of suitable shapes are possible.

Glove Box

FIGS. 4–6 show glove box 16 in more detail. As shown, glove box 16 includes a plurality of walls 30 which define an enclosure 32 which is useful for holding articles such as road maps, pens, pencils, vehicle registration papers, and other articles commonly held in a glove box. Walls 30 comprise two side walls 31 and an end wall 33. Glove box 16 includes a perimetral edge region 34 which is integral with each of side walls 31, and which is attached to a door 40 by a plurality of screws 36.

The glove box is also adapted to provide a dash connection which is advantageously in the form of a pivot connection. As shown, the dash-box connection includes features on the box which are adjacent the lower corners of perimetral edge region 34. As perhaps best seen in FIG. 6, a pair of mounting pin receivers 35 are included for receiving respective mounting pins 46 which form a part of a releasable connection between glove box 16 and dash 12 described in more detail below. The mounting pins are preferably mounted on dashboard 12 adjacent opening 14. The releasable connection which is formed between the glove box and the opening in dashboard 12 is important for it allows the glove box to be selectively removed from the dashboard. This provides improved access to the interior of the dashboard, and allows cleaning and maintenance for the box itself.

Glove box 16 may be inserted into or removed from opening 14. When inserted, the glove box may be secured by latch feature 18 in a manner described in greater detail below.

Door

The assembly further includes a door 40 is mounted on glove box 16. It is advantageously movable between an opened position in which enclosure 32 may be accessed from the front of dashboard 12 (FIGS. 2 and 4), and a closed position in which enclosure 32 may not be accessed from the front of dashboard 12 (FIGS. 1 and 4). Because door 40 is mounted on glove box 16, the glove box is also moved between the opened position and closed position when door 40 is moved.

Detachable Box Connection System

The invention includes a detachable box connection system which allows the box-door assembly to be either removed or locked in the dash. The connection system includes a latch and a dash-box assembly connection joint. The two work together to fully secure the box-door assembly in place when closed and locked by the latch. In the open condition, the latch is open and the connection joint retains the box-door assembly to the dash unless released.

In the preferred connection joint, glove box 16 and door 40 are detachably mounted within opening 14 by virtue of a pair of mounting pins 46 which are mounted in respective bosses 47, a representative one of which is shown in FIG. 7 and discussed in more detail below. Each of mounting pins 46 is received in a respective mounting pin receiver 35. Glove box 16 and door 40 provide a subassembly which is mountable within opening 14 of dashboard outer surface 20 and movable, preferably pivotably, between an opened position and closed position described in more detail below.

Discussing mounting pin receiver 35 and mounting pin 46 in more detail, attention is directed to FIG. 7 which is an enlarged perspective view of such pin and receiver according to a preferred aspect of the invention. It will be understood that an identical mounting pin receiver 35 and mounting pin 46 are located adjacent the other corner of perimetral edge region 34. Boss 47, as shown, provides a seat in which mounting pin 46 is firmly fixed. The mounting pin extends outwardly relative to boss 47 and into opening 14 a sufficient distance to be received and captured by mounting pin receiver 35.

Mounting pin receiver 35 may be an integral part of glove box 16 or perimetral edge region 34, or it may be separately formed and connected thereto as by any suitable connector such as chemical adhesives or mechanical fasteners. A preferred mounting pin receiver 35 includes a base 50, a dog 52, and a detent 54. Base 50 is firmly grounded against an interior surface of perimetral edge region 34 and held flush thereagainst by a plurality of screws, a representative one of which is shown at 36. Dog 52 is joined or otherwise connected to base 50 and curves generally away from the interior surface of perimetral edge region 34 forming a hook which, together with detent 54, defines a capture region 56 for capturing a portion of mounting pin 46. The above-described mounting pin and mounting pin receiver form a part of the releasable connection joint between glove box 16 and opening 14. Mounting pin 46 (and mounting pin receiver 35) define a preferred joint with associated pivot axis 58 about which glove box 16 and door 40 may be pivoted between the opened position in which enclosure 32 may be accessed, and a closed position in which enclosure 32 may not be accessed. Pivot axis 58 is preferably generally horizontally oriented and parallel to front surface area 21. Pivot axis 58 may also have other orientations.

It will be appreciated that although a mounting configuration as between glove box 16, door 40, and dashboard 12 has been described which is pivotable in nature, other mounting configurations which are not necessarily pivotable as described above may be used to practice the invention.

Furthermore, although mounting pin receiver 35 has been described as being mounted on glove box 16, and mounting pin 46 has been described as being mounted on dashboard 12 adjacent opening 14, it will be understood that this configuration is only a preferred one, and, as such, other configurations are possible. More to the point, it is possible for a mounting pin to be mounted on glove box 16 and a mounting pin receiver to be mounted on dashboard 12 for engaging the mounting pin. Moreover, different mounting configurations such as ones which do not necessarily employ the described mounting pin and mounting pin receiver may be used for achieving the advantages provided by the invention.

Latch Mechanism

Latch 42 is operatively mounted on door 40 for advantageously locking door 40 in the closed position. Latch 42 forms a part of the releasable connection between glove box 16 and opening 14 and, as such, allows glove box 16 to be released and removed from opening 14 for providing convenient access to the dashboard interior. Preferred components of latch 42 include a latch handle 60, a depressible, lockable release button 62, and a retractable, spring-loaded detent 64. Detent 64 is operatively connected to button 62 for selective retractability as to enable door 40 and hence glove box 16 to be released or secured and locked on or to dashboard 12.

Latch handle 60 is positioned on door 40 very near the top of the door as viewed in FIG. 1. Latch handle 60 is configured to permit an individual to grip the handle by looping a finger underneath in an area between the latch handle and the door so that the thumb may be used to depress button 62. Upon depressing button 62, spring-loaded detent 64 is retracted which unlocks door 40 from its closed position. Latch 42 may be any suitable latch which is capable of securing the glove box and door in the closed position. For example, button 62 may be replaced in favor of a turnable knob which similarly serves to operatively disengage detent 64 from its secured or locked position. Needless to say, there are simply numerous latch and latch-type configurations which might be used to practice the invention, all of which are considered to be within the spirit and scope of the invention.

A latch receiver 44 is advantageously provided and works in concert with latch 42 to ensure that door 40 may be securely closed, and that glove box 16 is secured within opening 14. A suitable latch receiver 44 may be provided by the interior surface 45 of opening 14 alone, or may include a separate structure which is mounted interiorly of dashboard 12 for receiving and engaging latch 42. One such separate structure is shown in FIG. 6 in the form of an engagement fixture 51 which includes a light source for illuminating enclosure 32 when the glove box is opened. More specifically, spring-loaded detent 64 includes a surface which serves to engage latch receiver 44 (engagement fixture 51) and prevents glove box 16 from being opened once the glove box is closed. Button 62 allows detent 64 to be retracted so that door 40 and hence glove box 16 may swing open for providing access to enclosure 32. In the event that button 62 is locked as by a key, such would have to be unlocked before opening the glove box.

Operation

In operation, the invention provides a dashboard and glove box assembly which allows for quick, convenient access to an area, such as interior area 22, inside of the dashboard. Such quick and convenient access is desirable for facilitating servicing of vehicle components, such as wiring, electronic componentry, and heating and/or air conditioning conduits and the like, which are housed in area 22. A glove box and door subassembly are also provided which include a latch feature which serves a number of different purposes. The latch feature ensures that door 40 and glove box 16 are maintained in a closed, locked position relative to dashboard 12. When door 40 is closed, the latch feature ensures that glove box 16 remains operatively connected relative to opening 14 so that it cannot be removed therefrom. The latch feature also provides or defines a pivot axis, such as pivot axis 58 about which glove box 16 may be moved.

Upon unlatching or otherwise releasing latch feature 18, and more specifically latch 42, door 40 and glove box 16 may be pivoted open about axis 58 for providing access to enclosure 32. Additionally, when latch feature 18 or latch 42 is unlatched, glove box 16 may be conveniently removed from opening 14 for providing access to area 22.

Convenient removal and/or insertion of glove box 16 from or into opening 14 is made possible by two mounting pins which are received in respective mounting pin receivers which are mounted on glove box 16 as described above with reference to FIG. 7. More specifically, each such mounting pin receiver 35 includes a capture region 56 which is defined by a curved or hooked dog 52 and a detent 54 spaced from dog 52 on the receiver base 50. To mount the glove box within opening 14 on dashboard 12, one need simply line up mounting pin receivers 35 on either side of glove box 16 so that each respective capture region 56 faces downwardly and toward a respective mounting pin 46. Then, by placing each capture region 56 adjacent a respective mounting pin 46 and exerting a downwardly applied force on the glove box, each respective mounting pin 46 may be slipped over a respective detent 54 and snapped into place in capture region 56. This retains the box-door assembly to the dash and allows the above-described pivotable movement of glove box 16 between the opened and closed positions.

Removing glove box 16 from dashboard 12 may be done by simply moving or pivoting the glove box to an open position, and lifting slightly upwardly and outwardly on the glove box relative to the dashboard with a sufficient amount of force to dislodge or otherwise cause the release of each mounting pin from its respective mounting pin receiver. Thereafter, area 22 (FIG. 3) interiorly of the dashboard is exposed and may be accessed with ease.

As mentioned above, such operation provides a heretofore unavailable convenience which will be most appreciated by an individual having an occasion to access the interior of dashboard 12 for the purpose of providing some type of service or maintenance. By providing an easily removable glove box for accessing an opening in the dashboard, an individual is spared the extra work of having to remove all or a part of a dashboard to access the same area. This is true whether an individual is performing first time maintenance such as that associated with the initial assembly of a vehicle at a factory location, or post-purchase maintenance as might be done by an owner of such vehicle.

The invention has been described in language more or less specific as to structural, methodological, or other aspects and features. It is to be more properly understood that the invention is not necessarily limited to the specific forms shown and described. Other equivalent structures and features may also be within the inventive concepts which are appropriately protected under the grant of patent rights being sought. The invention is therefore being claimed in an effort to define the invention but the various forms or modifications which the invention may take is difficult or impossible to define with certainty. Judgement must be utilized to properly interpret the scope of protection which is to be appropriately applied with regard to these new and inventive concepts.

I claim:

1. A dashboard and glove box assembly for mounting within a vehicle comprising:

a dashboard having an opening formed therein; said opening providing access to an interior area within said dashboard;

said dashboard having an outer surface;

a glove box having walls defining an enclosure; said glove box being removably insertable into said opening;

a door connected to said glove box along a front portion thereof;

a connection joint forming a releasable connection between said glove box and said opening; said connection joint having a single pivot axis about which said glove box may be pivoted between a fully closed position and a fully opened position; said door preventing access to said enclosure when said glove box is in the fully closed position; said fully opened position allowing access to the enclosure when said glove box is moved thereto;

said glove box being constructed such that rearward portions of the enclosure engage the dashboard when the glove box is in the fully open position to stop pivotal movement of the glove box;

whereby said glove box and door may be conveniently and totally removed from said opening for providing unencumbered access to the interior area within said dashboard through said opening.

2. The dashboard and glove box assembly of claim 1, wherein the connection joint comprises:

a mounting pin;

a boss adjacent said dashboard opening; said mounting pin being received by said boss and extending into said opening; and a mounting pin receiver operatively connected on said door and configured to releasably receive said mounting pin.

3. A dashboard and glove box assembly for mounting in a vehicle for providing access to a dashboard interior, comprising:

a dashboard having an opening formed therein; said opening providing access to an interior area within the dashboard;

a glove box defining an enclosure for holding articles; said glove box being receivable within said opening;

a single door fixedly connected to said glove box; said single door having a front surface and a back surface; said single door and said glove box being movable as a unit between an opened position in which the enclosure may be accessed from outside the dashboard, and a closed position wherein the opening is fully closed;

a latch operatively mounted on the door for fixing the door in the closed position;

a pair of releasable connection joints between said glove box and said dashboard said releasable connection joints permitting said glove box to be removed from said dashboard to allow unencumbered access to the dashboard interior; said pair of releasable connection joints comprising:

a pair of mounting pins mounted within the dashboard opening and extending thereinto;

a pair of mounting pin receivers mounted adjacent the back surface of the door for releasably receiving the mounting pins therein; said mounting pin receivers and said mounting pins defining a pivot axis about which said glove box and said door may be pivoted between the closed position and the opened position;

said pivot axis defining the only axis relative to which said glove box and said single door can be pivoted to completely cover said enclosure when said single door and said glove box are moved to the closed position.

4. The dashboard and glove box assembly of claim 3, wherein said pair of mounting pin receivers each comprising:

a base having a top surface and a bottom surface; said base being disposed adjacent a back surface of the door;

a dog joined to said base; said dog curving away from said base to define at least portions of a capture region which receives one of said mounting pins.

5. The dashboard and glove box assembly of claim 3, wherein said pair of mounting pin receivers each comprising:

a base having a top surface and a bottom surface; said base being disposed adjacent a back surface of the door;

a dog joined to said base; said dog curving away from said base to define at least portions of a capture region which receives one of said mounting pins;

a detent joined to said base and extending from the base; said detent and said dog defining a capture region for releasably receiving one of said mounting pins; said detent impairing dislodgment of the mounting pin when the mounting pin is received in said capture region.

* * * * *